March 7, 1961 E. E. PRATHER 2,973,844
AUTOMATIC BRAKE HOLDING SYSTEM
Filed Oct. 23, 1957
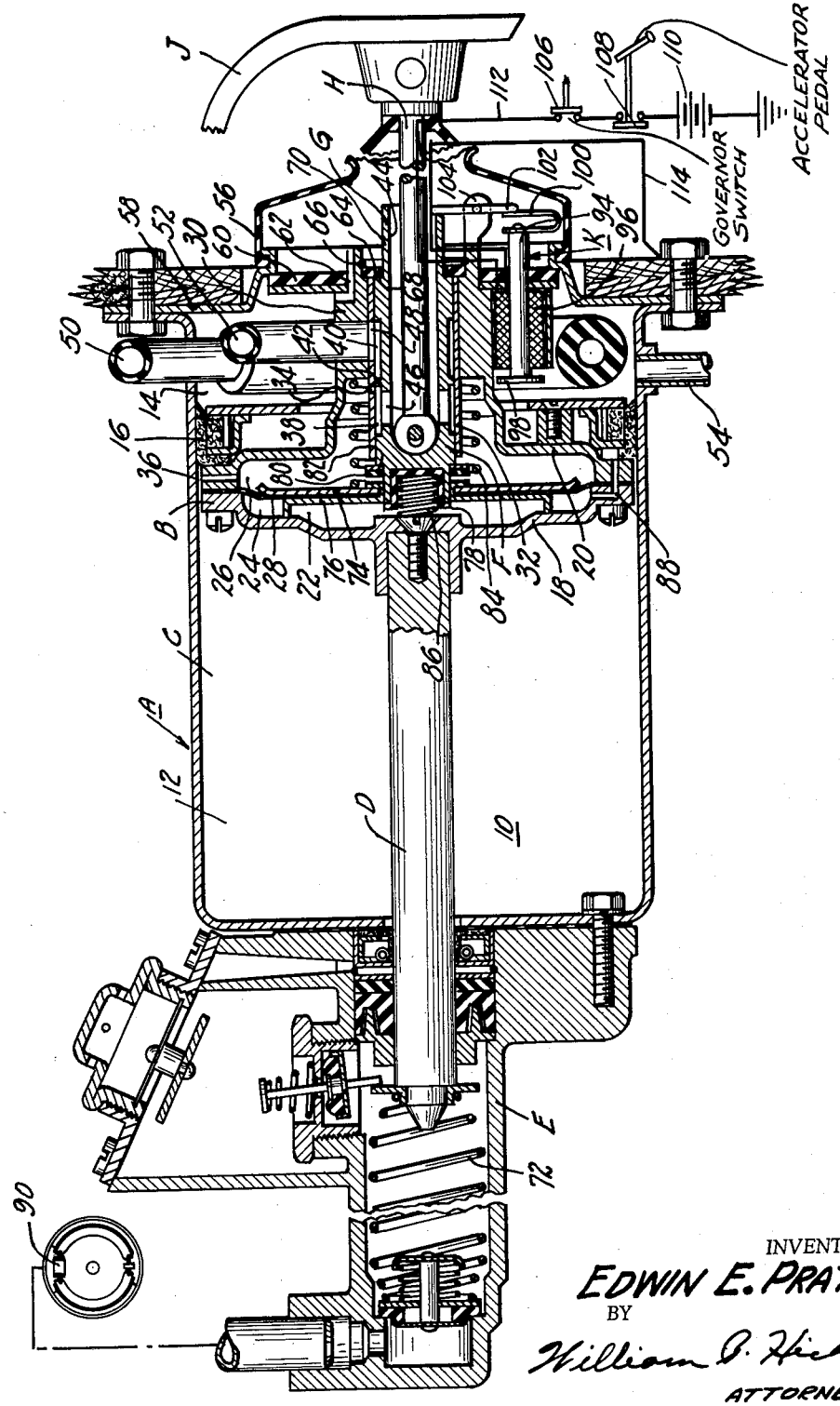
INVENTOR.
EDWIN E. PRATHER
BY
William P. Hickey
ATTORNEY United States Patent Office 2,973,844
Patented Mar. 7, 1961

2,973,844

AUTOMATIC BRAKE HOLDING SYSTEM

Edwin E. Prather, Cassopolis, Mich., assignor to The Bendix Corporation, a corporation of Delaware Filed Oct. 23, 1957, Ser. No. 691,877

4 Claims. (Cl. 192—3)

The present invention relates to servo-motors of a type having a control member whose actuating movement is opposed by reaction means; and more particularly to a pneumatically powered servo-motor having control valve means mounted on its pressure actuated element and in which means are provided to oppose actuating movement of the control member by an amount generally proportional to the force being delivered by the servo-motor.

An object of the present invention is the provision of a new and improved servo-motor having a control member whose actuating movement is opposed by means providing a reaction generally proportional to the force being delivered by the servo-motor, and further comprising means which under certain control conditions biases the control member in an actuating direction by a generally predetermined force that is opposed by the reaction means to cause the servo-motor to be actuated to provide a generally predetermined output force.

A more specific object of the present invention is the provision of a new and improved pneumatic powered fluid pressure servo-motor of a type having control valve means mounted directly on the servo-motor's pressure actuated element, and further comprises means mounted on the pressure actuated element and which can be caused to actuate the control member with a generally predetermined force that is opposed by the servo-motor's reaction means to cause the servo-motor to be actuated at a generally predetermined level of energization.

A still more specific object of the present invention is the provision of a new and improved servo-motor of the above mentioned type for the actuation of the braking system of an automotive vehicle having a governor switch and a throttle controlled switch which will cause the servo-motor to actuate the braking system with a generally predetermined force when the throttle is closed and the vehicle is traveling below a predetermined speed to provide what is commonly called "no creep."

A still further object of the present invention is the provision of a new and improved "no creep" braking system for an automotive vehicle, and/or a servo-motor of a type to be used therein, which is simple and rugged in construction, reliable and efficient in its operation, and is inexpensive to manufacture.

The invention resides in certain constructions and combinations and arrangements of parts, and further objects and advantages of the present invention will be apparent to those skilled in the art to which the invention relates from the following description of the preferred embodiment described with reference to the accompanying drawing forming a part of this specification.

Although the invention may be embodied in other types of servo-motors, it is herein shown and described as embodied in a pneumatic powered fluid pressure servo-motor of the type used to actuate the hydraulic braking system of an automotive vehicle. The drawing is a schematic view of an automotive braking system in which a servo-motor embodying principles of the present invention is shown in section. The servo-motor A shown is of the "atmospheric submerged type" which is energized or actuated when vacuum from the vehicle's engine is admitted to the servo motor. The servo-motor A generally comprises a pressure responsive movable wall or piston B which is mounted in a power chamber or cylinder C, and which is adapted to actuate a driven or fluid displacement member D which projects into a hydraulic cylinder E suitably affixed to one end of the power cylinder C. Actuation of the unit is regulated by a control valve F having a movable control member G, which is adapted to be positioned by a push rod H connected to the foot pedal lever J of the vehicle. The control valve F and control member G are so constructed and arranged that manual force on the control member G will be transmitted directly to the driven member D during power failure of the servo-motor.

The internal chamber 10 of the cylinder C is divided into inner and outer opposing chambers, 12 and 14 respectively, by the pressure responsive movable wall or piston B which carries suitable sealing means 16 on its radially outer edges for providing a seal with respect to the sidewalls of the internal chamber 10. The power piston B is formed by means of front 18 and rear 20 die-cast sections suitably bolted together to provide an internal reaction chamber 22 which in turn is divided into front and rear opposing reaction chambers 24 and 26 respectively by a diaphragm 28, the outer edges of which are clamped between the die cast sections 18 and 20.

The control valve F is formed in an axially rearwardly extending boss 30 in the rear die cast section 20 by means of a brass sleeve 32 pressed into the boss, and the movable control member G which is slidably received within the sleeve 32 to form a slide valve structure. A control port or opening 34 is provided in the sleeve 32 to communicate the inside of the sleeve 32 with the outer opposing chamber 26, from which the control pressure is continually communicated with the forward opposing chamber 12 of the servo-motor by means of a suitable passage 36 in the power piston B.

The control member G is constructed and arranged to control communication of the control port 34 with atmospheric or vacuum pressures and thereby control the pressure within the inner opposing chamber 12. The outer surface of the cylindrically shaped control member G is provided with front and rear annular recesses 38 and 40 respectively which are separated by means of a land portion 42 which has a generally sliding sealing fit with respect to the inner walls of the sleeve 32. The movable control member G is drilled axially 44 from its outer or rearwardly positioned end to provide communication with a transverse drilling 46, which intersects the front annular recess 38 and provides continuous atmospheric communication therewith. A transverse drilling 48 is provided through the boss 30 and sleeve 32 to at all times provide vacuum communication with the rear annular recess 40 of the movable control member G. Vacuum from the manifold of the propelling engine of the vehicle is supplied to the transverse drilling 48 by means of a vacuum conduit 50 having first and second rigid portions connection with the boss 30 and sidewalls of the cylinder C respectively, and having an intermediate flexible portion formed by means of a section of rubber hose 52. Atmospheric pressure is continually supplied to the rear opposing chamber 14 through the connection 54. A rubber dirt seal or boot 56 is provided between the rear cover plate 58 and the push rod H; and atmospheric pressure from the rear opposing chamber 14 is continually communicated to the inside of the rubber boot 56, and hence around the outer end of the boss 30 to the rearwardly positioned end of the control member G. A rubber coated abutment washer 60 is provided on the boss 30 for engagement with the rear cover plate 58 during the de-energized condition of the servo-motor, in which position its power piston B is fully retracted. Atmospheric pressure is transmitted thereacross in this position by means of a suitable passage 62 in the boss 30.

A return stop is provided for the movable control member G by means of an annular non-metallic washer 64 held in a recess in the rear end of the boss 30 by means of a snap-ring 66 at such a position as to contact a shoulder 68 on the control member G as provided by means of an outer reduced diameter section 70 of the control member G. In the position shown in the drawing, wherein the control member G is in engagement with the non-metallic washer 64, the land portion 42 of the control member will be positioned just rearwardly from the control port 34, such that atmospheric pressure will be communicated to both the rear opposing reaction chamber 26 and the forward opposing chamber 12. Atmospheric pressure is, therefore, communicated to both sides of the power piston B, and the power piston B will be held in its de-energized or retracted position, previously described, by means of a coil spring 72 in the hydraulic cylinder E.

Actuation of the servo-motor is obtained by moving the control member G forwardly or inwardly to move the land portion 42 past the outer edge of the control port 34, and thereby communicate vacuum from the rear annular recess 40 with the rear opposing reaction chamber 26 and forward opposing chamber 12 to bias the power piston B forwardly or inwardly and drive the displacement member D into the hydraulic cylinder E.

Reaction or "feel" is provided against the control member G to bias the control member G toward its de-energized or retracted position with a force generally proportional to that being delivered by the displacement member D to thereby appraise the operator of the amount of force being delivered by the servo-motor. The center portion of the diaphragm 28 is stiffened by front and rear plates 76 and 74 respectively, and the radially inner edge of the front annular plate 76 is bent rearwardly around the rear annular plate 74 to provide a sliding sealing fit with the inner end of the movable control member G. Rearward movement of the diaphragm structure 28 is limited by a rubber coated annular washer 80 positioned against the shoulder 82 provided by the inner reduced diameter section 78; and a delay reaction coil spring 84 biases the diaphragm 28 forwardly away from the washed 80 into abutment with the inner end of the reaction chamber 22. A control member return spring 86 is positioned between the inner end of the movable control member G and the inner end wall of the reaction chamber 22 to provide an initial force which biases the movable control member G into its retracted position when no pressure differential exists across the diaphragm 28. Atmospheric pressure is continually supplied to the forward opposing reaction chamber 24 by a suitable passageway 88 such that the same pressure differential being delivered across the power piston B will be experienced across the reaction diaphragm 28, but in a reverse direction to oppose the control movement of the control member G.

As previously explained, the servo-motor is of the atmospheric submerged type in which atmospheric pressure is communicated to both of the opposing chambers 12 and 14 respectively when the servo-motor is de-energized. Operation of the servo-motor structure so far described is initiated by the depressing of the foot pedal lever J whereupon the push rod H forces the movable control member G forwardly within the sleeve 32 causing the land portion 42 to be moved forwardly of the rear edge of the control port 34, and thereby communicate vacuum with the inner opposing chamber 12 of the servo-motor. Forward movement of the control member G, causes a pressure differential to be provided across the power piston B which biases the displacement member D into the hydraulic cylinder E. Fluid displaced from the hydraulic cylinder E is conducted to the brake applying wheel cylinders 90 (only one of which is shown) of the vehicle to produce a braking application whose intensity is directly proportional to the force delivered upon the fluid displacement member D. Vacuum communication between the rear annular recess 40 and the control port 34 will continue until such time as the pressure differential across the reaction diaphragm 28 is sufficient to produce a force which overcomes the delayed reaction coil spring 84 to bias the diaphragm 28 into engagement with the rubber coated washer 80. When the pressure differential across the diaphragm produces a force which substantially equals that being applied by the operator upon the foot pedal lever J, diaphragm 28 will move the control member G rearwardly to cause the land portion 42 to close off or isolate the control port 34 from both of the recesses 38 and 40—thereby preventing further pressure change within the rear opposing reaction chamber 28 and the forward opposing chamber 12. The position of the power piston B within the power cylinder C, at this time, will be determined by the amount of fluid which was displaced from the hydraulic cylinder E in order that the pressure force upon the displacement member D exactly equals that being applied thereto by the servo-motor.

When it is desired to reduce the braking effort being developed by the servo-motor, the foot pedal lever J may be retracted to cause the land portion 42 to be moved rearwardly sufficiently to permit atmospheric communication between the forward annular recess 38 and the control port 34—thereby decreasing the pressure differential across the diaphragm 38 and the power piston B. This reduction in pressure will continue until such time as the pressure differential across the diaphragm 38 no longer exceeds the force being held against the control member G by the foot of the operator; whereupon the piston will move rearwardly relative to the control member sufficiently to cause the land portion 42 to close off the control port 34. A complete removal of applying effort upon the foot pedal lever J, will of course, permit the coil spring 72 to move the control member G into engagement with the non-metallic washer 64 to permit full atmospheric pressure to be delivered to the inner opposing chamber 12. Complete release of pressure differential across the power piston B thereby permits the coil spring 72 to move the power piston B into its retracted position wherein the abutment washer 60 is in engagement with the rear cover plate 58 as shown in the drawing. It should also be stated, that upon power failure, actuation of the foot pedal lever J will move the control member G inwardly against the inner wall of the reaction chamber 22 to permit the fluid displacement member D to be forced forwardly by the manual effort applied directly against the control member G.

The servo-motor structure shown in the drawing is completed by control means K which actuates or biases the control member G forwardly with a generally pre-determined force to cause the servo-motor to be energized to a pre-determined level, such that a generally pre-determined hydraulic pressure will be developed in the hydraulic cylinder E and the brakes of the vehicle will be applied by that effort. The control means K, shown, comprises a solenoid whose coil is mounted directly upon the power piston D in such manner that its armature 94 will be biased rearwardly when its coil 96 is energized. The forward end of the armature 94 is provided with a stop 98 which abuts the forward end of the coil 96 to limit the amount of rearward movement of the armature 94, and the rear end of the armature 94 is connected to one end of a compression leaf spring 100. The other end of the compression spring 100 bears against one end of a lever 102 which is pinned at its center to a bifurcated projection 104 on the boss 30 and the other end of the lever bears against the rearwardly positioned end of the control member G to cause the control member G to be biased forwardly when the coil 96 is energized. It will therefore be seen that energization of the coil 96 will cause a generally predetermined actuating force to be delivered to the control member G—which force, of course, will be opposed by the reaction diaphragm 28 to cause a generally predetermined pressure differential to be delivered across the power piston B, and a generally predetermined force to thereby be delivered to the displacement member D.

As previously indicated the servo-motor A shown in the drawing is adapted to be used to actuate the hydraulic braking system of an automotive vehicle in such manner as to apply the brakes of the vehicle applied when the vehicle is traveling at a speed below a generally predetermined rate. Such systems are commonly called "no creep" systems and are designed to permit the operator to hold the brakes applied between the time that the operator's foot is removed from the brake pedal lever and is applied to the accelerator pedal. A governor switch 106 is provided in the electrical supply circuit for the coil 96, which switch is closed at speeds below approximately 5 miles an hour, and is open at speeds above approximately 5 miles an hour. The electrical supply circuit for the coil 96 also includes a normally closed switch 108, which switch is adapted to be opened whenever the accelerator pedal of the vehicle is moved out of its retracted position. The electrical supply circuit will also include the vehicle's battery 110, the connecting wire 112 leading to the coil 96, and the connecting wire 114 which grounds the other end of the coil 96 to the rear cover plate 98 of the servo-motor.

The control means K is brought into operation or is adapted to actuate the servo-motor A whenever the automotive vehicle is traveling at a speed below approximately 5 miles an hour and the accelerator pedal is in its retracted position. At such a time both the contacts of the governor switch 106 and the contacts of the throttle controlled switch 108 will be closed. The resulting energization of the coil 96 will bias the armature 94 rearwardly until the stop 98 moves into engagement with the end of the coil 96 so as to deform the compression spring 100 by a generally predetermined amount, and thereby deliver a generally predetermined force upon one end of the lever 102. This force will be delivered through the lever 102 to the movable control member G, biasing it forwardly sufficiently to cause the land 42 to move past the rear edge of the control port 34, and thereby communicate vacuum with the rear opposing reaction chamber 26 and the forward opposing chamber 12 of the servo-motor. Vacuum continues to flow to each of these chambers until such time as sufficient differential pressure is developed across the reaction diaphragm 28 to oppose the force being delivered against the movable control member G by the compression spring 100; whereupon, the control member G will be moved rearwardly causing the land portion 42 to close off the control port 34. Further vacuum communication to the outer opposing reaction chamber 26 and inner opposing chamber 12 will thereafter be prevented and the displacement member D will be held applied by a generally predetermined force. This, of course, will produce a braking application of generally predetermined intensity.

When it is desired to get the vehicle under way again, a depressing of the accelerator pedal will open the switch 108 to de-energize the coil 96—thereby disabling the control means K. At speeds above approximately 5 miles an hour, the governor switch 106 will always be open; so that the accelerator pedal may be released, and the switch 108 closed without resulting in a dragging of the brakes.

While the present invention has been described as embodied in a fluid pressure servo-motor for actuating the brakes of an automotive vehicle, it is not so limited; and it is intended that the spirit of the invention may be embodied in still other types of servo-motors. While the control means K has been described as being actuated upon an energization of the coil 96, the invention is not so limited; inasmuch as the armature could be actuated by means of a spring whose force would be held off at speeds above approximately 5 miles an hour by means of the energization of the coil 96. Under such conditions, of course, the governor switch 106 would be a normally open one which becomes closed at speeds above approximately 5 miles an hour, and the switch 108 would be a normally open switch which would be closed when the accelerator pedal was moved out of its released or retracted position.

While the invention has been described in considerable detail, I do not wish to be limited to the particular constructions shown and described, and it is my intention to cover hereby all adaptations, modifications, and arrangements thereof which come within the practice of those skilled in the art to which the invention relates.

I claim:
1. In a speed control system for a movable device having a brake, a propelling motor having a speed regulating lever for controlling the speed of said movable device, and a speed responsive governor switch driven in timed relation with said movable device and having contacts which are in one condition below a generally predetermined speed of the device and are moved to a second condition at speeds above said generally predetermined speed: a servo-motor having a power actuatable member which when actuated in a given direction actuates said brake, first control means having a control member which when actuated in a given direction causes said power actuatable member to be biased in a direction to actuate said brake, reaction means constructed and arranged to deliver a reaction against said control member which opposes its actuation with a force generally proportional to the force applied to said brake by said servo-motor, an armature operatively connected to said control member for applying a generally predetermined force to said control member when said armature is biased in one direction, second control means including an electrical coil for controlling the biasing of said armature, a control switch operated by said speed regulating lever, said control switch being in one condition when said speed regulating lever is adjusted to provide motor speeds below a generally predetermined value and to be in another condition when said speed regulating lever is adjusted to provide speeds above said generally predetermined value, and an electrical supply circuit connecting said electrical coil, said governor switch, and said control switch, said switches and said second control means being constructed and arranged to bias said armature in said one direction when the speed of said movable device is below said generally predetermined speed and said speed regulating lever is adjusted to provide motor speeds below said generally predetermined value, and to release the bias of said armature when one of said switches is moved to its other condition.

2. In a speed control system for a movable device having a brake, a propelling motor having a speed regulating lever for controlling the speed of said movable device, and a speed responsive governor switch driven in timed relation with said movable device and having contacts which are closed below a generally predetermined speed of the device and are opened at speeds above said generally predetermined speed: a servo-motor having a power actuatable member which when actuated in a given direction actuates said brake, first control means having a control member which when actuated in a given direction causes said power actuatable member to be biased in a direction to actuate said brake, reaction means constructed and arranged to deliver a reaction against said control member which opposes its actuation with a force generally proportional to the force applied to said brakes by said servo-motor, an armature operatively connected to said control member for applying a generally predetermined force to said control member when said armature is biased in one direction, second control means including an electrical coil for biasing said armature in said one direction when energized, a control switch operated by said speed regulating lever, said control switch being closed when said speed regulating lever is adjusted to provide motor speeds below a generally predetermined value and being open when said speed regulating lever is adjusted to provide speeds above said generally predetermined value, and an electrical supply circuit connecting said electrical coil, said governor switch, and said control switch, whereby said brake will be held applied when said device is moving at a speed below said predetermined speed and said speed regulating lever is adjusted to provide motor speeds below said predetermined speed.

3. In an automotive vehicle having brakes, a propelling motor with a throttle leverage system for controlling the speed of the vehicle, and a governor switch having contacts which are in one condition below a generally predetermined speed of the vehicle and are moved to a second condition at speeds above said generally predetermined speed: a fluid pressure servo-motor having a pressure responsive movable wall which when pressure differential is applied thereacross actuates said brakes, valve means having a control member which when actuated supplies pressure differential across said movable wall in a direction to actuate said brakes, reaction means constructed and arranged to deliver a reaction against said control member which opposes its actuation with a force generally proportional to the force applied to said brakes by said servo-motor, an armature operatively connected to said control member for applying a generally predetermined valve actuating force to said control member when said armature is biased in one direction, control means including an electrical coil for controlling the biasing of said armature, a control switch operated by said throttle, said control switch being in one condition when said throttle leverage system is adjusted to provide motor speeds below a generally predetermined value and to be in another condition when said throttle leverage system is adjusted to provide speeds above said generally predetermined value, and an electrical supply circuit connecting said electrical coil, said governor switch, and said control switch, said switches and control means being constructed and arranged to bias said armature in said one direction when said vehicle speeds are below said generally predetermined speed and said throttle leverage system is adjusted to provide motor speeds below said generally predetermined value, and to release said bias of said armature when one of said switches is moved to its other condition.

4. In an automotive vehicle having brakes, a propelling motor with a throttle lever for controlling the speed of the vehicle, and a governor switch having contacts which are closed below a predetermined speed of the vehicle and are open at speeds above said generally predetermined speed: a fluid pressure servo-motor having a pressure responsive movable wall which when pressure differential is applied thereacross actuates said brakes, valve means having a control member which when actuated supplies pressure differential across said movable wall in a direction to actuate said brakes, reaction means constructed and arranged to deliver a reaction against said control member which opposes its actuation with a force generally proportional to the force applied to said brakes by said servo-motor, an armature operatively connected to said control member for applying a generally predetermined valve actuating force to said control member when said armature is biased in one direction, an electrical coil for biasing said armature in said one direction when energized, a control switch operated by said throttle, said control switch being closed when said throttle leverage system is adjusted to provide motor speeds below a generally predetermined value and being open when said throttle leverage system is adjusted to provide speeds above said generally predetermined value, and an electrical supply circuit connecting said electrical coil, said governor switch, and said control switch, whereby said brake will be held applied when said device is moving at a speed below said predetermined speed and said throttle lever is adjusted to provide motor speeds below said predetermined speed.

References Cited in the file of this patent
UNITED STATES PATENTS

| | | |
|---|---|---|
| 2,079,978 | Weiss | May 11, 1937 |
| 2,192,021 | Weeks | Feb. 27, 1940 |
| 2,336,887 | Piron | Dec. 14, 1943 |
| 2,473,038 | Rockwell | June 14, 1949 |
| 2,626,026 | Sherwood et al. | Jan. 20, 1953 |
| 2,747,697 | Banker | May 29, 1956 |
| 2,845,904 | Hupp | Aug. 5, 1958 |
| 2,857,887 | Rosback | Oct. 28, 1958 |